United States Patent Office 3,245,387
Patented Apr. 12, 1966

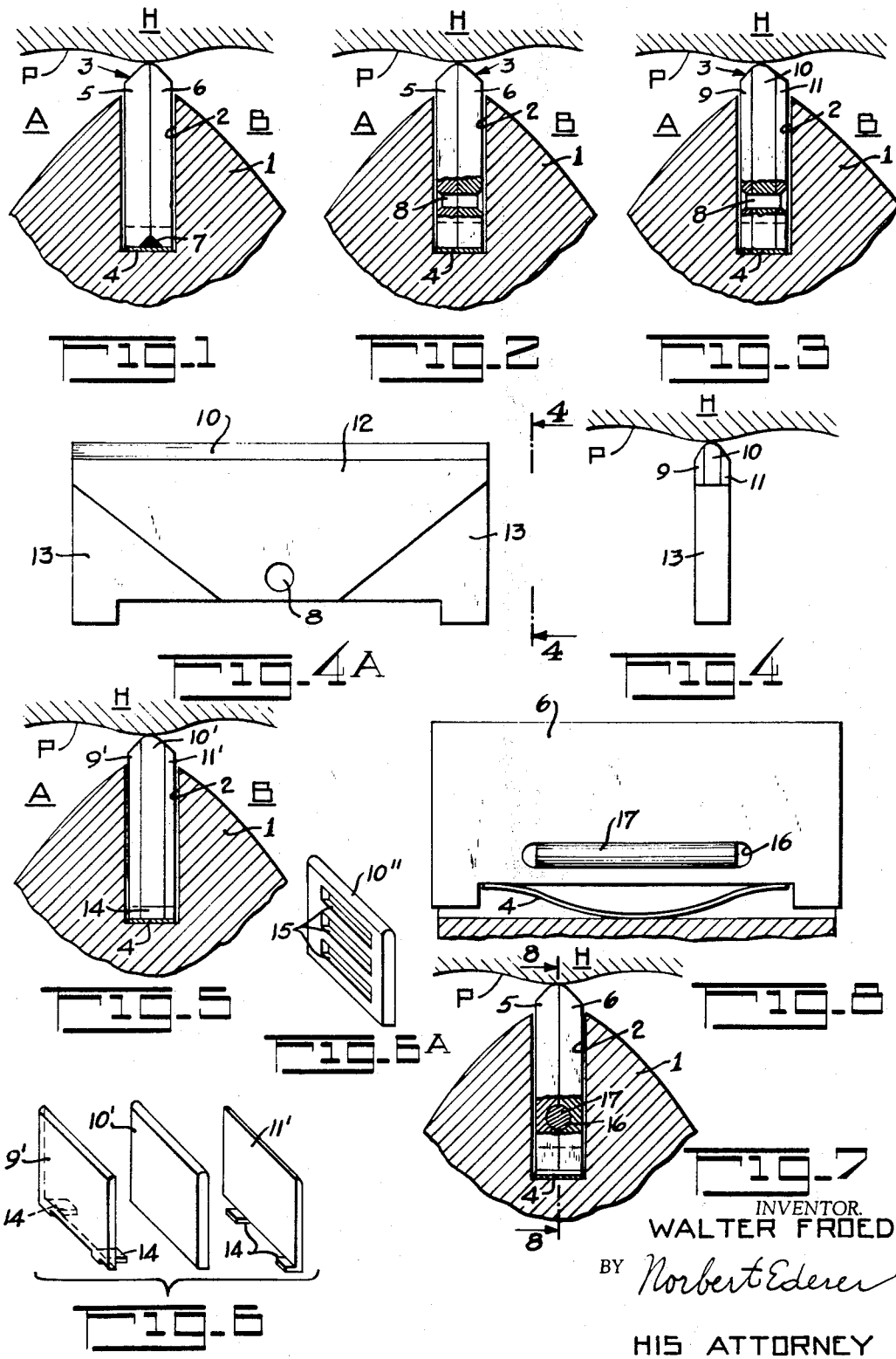

3,245,387
SEALING STRUCTURES
Walter Froede, Neckarsulm, Germany, assignor to NSU Motorenwerke Aktiengesellschaft, Neckarsulm, Germany, and Wankel G.m.b.H., Lindau (Bodensee), Germany
Filed Aug. 19, 1963, Ser. No. 302,857
Claims priority, application Germany, Aug. 25, 1962, N 22,011
13 Claims. (Cl. 123—8)

This invention relates to sealing structures, and in particular to apex sealing means used in rotary mechanisms.

The present invention is particularly useful in rotary combustion engines of epitrochoidal construction, that is of the kind described in U.S. Patents 2,988,065 and 3,064,880, and known in the art as Wankel engines. The following description, of both the background problems motivating the present invention and of the solution in accordance with the invention, is given by way of example in relation to Wankel engines, but it will be appreciated that the same considerations are applicable to similar rotary mechanisms.

Apex seals in Wankel engines perform the important function of sealing off adjacent engine working chambers from one another. In the evolution of the Wankel engines, apex seals have posed a variety of problems, such as loss of sealing effect, seal jamming, seal tilting, seal chatter, and even damage to the engine housing. A variety of apex seal structures have been proposed, designed to meet these problems. One such structure comprises plural seal strips which are stacked in a common receiving groove located at each of the engine rotor apices, with the plane defining each such stacked element being essentially parallel to the groove side wall, that is radially extending. The seal strips stack elements are freely movable in their respective radial planes relative to one another.

While the stacked type apex seal structure described in the preceding paragraph meets many of the noted drawbacks, it creates some new problems. The individual stack elements engage the inner peripheral wall surface of the engine housing with different angles of attack, owing to the epitrochoidal contour of the surface. This phenomenon of itself subjects the stack elements to large radial movements relative to one another and hence to great wear and bending stresses. The situation is aggravated by cyclic tilting of the apex seal during each engine rotor revolution, leading to breakage of the individual stack elements.

The present invention avoids these drawbacks by the provision of an apex seal structure, in which the plural seal stack elements or strips are fastened to one another near their radially inward end, that is near the bottom of their receiving groove. In this way, the seal strips cannot make radial movements relative to one another, so that they act as a one part apex seal. However, the structure has the advantage over a single-piece apex seal that the individual seal strips bend very easily, so that the otherwise experienced wear phenomena are substantially eliminated.

The strips may be connected to one another by welding, riveting, or by some other known joining method. An alternative way of joining the strips together is by loose insertion of a pin, which when displaced radially by centrifugal force effects a spreading apart of the seal strips at the bottom of the receiving groove, and presses these strips against the groove walls. In this way any oscillation of the strips, that might otherwise occur may be damped. This particular form of strip connection will be more fully developed in the description of FIGURES 7 and 8.

A feature of the present invention is an apex seal structure that comprises three or more seal strips. The two laterally extreme strips, hereinafter referred to as side strips, are shaped so that they do not engage the inner peripheral surface of the engine housing. Rather they engage solely the side walls of the receiving groove. The interior strips on the other hand do engage the inner peripheral surface of the housing. This arrangement permits selection of optimum characteristics with respect to the function to be fulfilled by each strip. The side strips are made of a material that has good sliding properties, so as to keep the friction between the apex seal and the groove side walls as low as possible. This material need not have good resistance to wear, because the side strips do not slide over the inner peripheral wall of the housing. The middle strip on the other hand is made of a material that is most favorably matched to the material of the inner peripheral surface.

Another advantageous feature of the invention is in the provision of lateral (transverse to axial) through-cutouts for the seal strips. This decreases the weight of the composite apex seal, and increases its ease of bending.

The invention and further objectives, advantages and novel features thereof, will be better understood from the following more detailed description, of which the appended claims form a part, when considered together with the accompanying drawing in which:

FIGURE 1 is a fragmentary end view, partly in elevation and partly in section, of apex seal structure in accordance with a first embodiment of the invention;

FIGURE 2 is a view similar to that of FIGURE 1, and illustrates apex seal structure according to a second embodiment of the invention;

FIGURE 3 is a view similar to that of FIGURE 1, and illustrates apex seal structure according to a third embodiment of the invention;

FIGURE 4 is a view similar to that of FIGURE 1, and FIGURE 4a is a corresponding side view, of a fourth embodiment of the invention;

FIGURE 5 is a view similar to that of FIGURE 1, and illustrates apex seal structure incorporating features of the apex seal structures shown in both FIGURE 1 and FIGURE 3;

FIGURE 6 is an exploded isometric view of the individual seal parts of FIGURE 5;

FIGURE 6a is an isometric view of seal strip structure alternative to that shown in FIGURE 6;

FIGURE 7 is a view similar to that of FIGURE 1, and illustrates yet another embodiment of the invention;

FIGURE 8 is a corresponding sectional view with a section taken along line 8—8 of FIGURE 7.

In the drawings, like reference numerals identify like parts.

In FIGURE 1 is shown a fragmentary illustration of a rotary combustion engine, which comprises an outer body or housing H, which is composed of a peripheral wall P which joins parallel end walls (not shown). The inner peripheral surface P of the housing H has a profile in the shape of a multilobed epitrochoid and in the particular illustration, the number of lobes may be assumed to be two. Disposed eccentrically within the housing H is the engine rotor 9 which has a profile conforming to the "envelope" curve of the epitrochoid that defines the housing surface P. As explained in greater detail in the above-mentioned Wankel patents, the "envelope" curve is that curve which makes sliding contact with the inner housing surface without interference, and accordingly the rotor may be assumed to be provided with apices whose number exceeds the number of epitrochoidal lobes by one, and in the particular illustration the number may be assumed to be three.

One such apex is illustrated in FIGURE 1. The apex is provided with a through running slot or groove 2, which extends axially from one rotor end face to the other. Within the groove 2 is seated an apex seal 3 with sufficient clearance to permit free lateral movement and free radial movement (up and down as viewed in FIGURE 1). The apex seal 3 is urged radially outwardly, against the inner peripheral surface P, by means of a spring 4, which is seated at the groove bottom and below the apex seal. The apex seal 3 serves to seal off from one another adjacent chambers A and B within the housing H, which contain gases at normally different pressures. The higher pressure gas is admitted into the groove 2 and also serves to urge the seal 3 against the inner peripheral wall P.

In accordance with the invention, the apex seal 3 is made of plural, axially-parallel strips which extend basically in the radial plane, and in the particular embodiment illustrated in FIGURE 1 two such strips 5 and 6 are shown. The strips 5 and 6 are connected together at their radially inward ends by a welded seam 7. By means of this interconnection, the two seal strips 5 and 6 act as a single-part apex seal in the sense that they are unable to make any radial movement relative to one another. However, by virtue of the multipart construction the strips 5 and 6 are highly flexible in comparison with a single-piece apex seal, so as to minimize the possibility of small breakage.

Referring to FIGURE 2, the therein illustrated embodiment differs from that of FIGURE 1 only in that the seal strips are joined together by a rivet 8 rather than seam 7.

The embodiment of the invention illustrated in FIGURE 3 is otherwise similar to that shown in FIGURE 2, except that three seal strips 9, 10 and 11 are joined together by rivets 8. Here the thicknesses and shaping of the individual strips are made such that only the middle seal strip 10 engages, at its crest, the inner peripheral surface P. The material of the strip 10 is selected so as to obtain optimum characteristics as respects operation and wear, in association with the material of the inner peripheral surface P. The side strips 9 and 11 on the other hand are made of a material that has good sliding properties with respect to the walls of groove 2. The following combination of materials has been found to be advantageous in this regard:

| | Material |
|---|---|
| Housing H | Chrome-plated aluminum. |
| Rotor I | Cast iron alloy. |
| Seal pieces 9, 11 | Nitrided steel. |
| Strip 10 | Sintered hard graphite. |

The apex seal structure illustrated in FIGURES 4 and 4a is similar to that shown in FIGURE 3, in that (see FIGURE 4) three strips 9, 10 and 11 are provided. However (see FIGURE 4a), the structure of FIGURE 3 is truncated so as to form a middle part 12 consisting of the strips 9, 10 and 11, and triangular end-leg parts 13, which are of one-piece design, and seal in the axial direction against the side parts of the housing. The strips 9, 10 and 11 are joined together by the rivet 8, as in FIGURE 3.

The embodiment illustrated in FIGURES 5 and 6 is similar to that of FIGURE 3, except for the method of joining the seal strips 9', 10', 11'. Here, instead of a rivet, lugs 14 are provided at the radially inward ends of the side seal strips 9', 11', and bent at right angles laterally inwardly with respect thereto. The middle strip 10' rests on the lugs 14. Advantageously, the lugs 14 of the seal strip 9' are offset axially relatively to those of seal strip 11'. The strips 9' and 11' may themselves be made identically, and installed mirror-image fashion. The lugs 14 also serve as bearing surfaces for the spring 4.

In FIGURE 6a is illustrated a middle strip 10'' provided with openings 15, which may be used in the embodiment shown in FIGURES 5 and 6 instead of seal strip 10'. The openings 15 are through-cutouts in the lateral direction, transverse to the axial direction, and serve for the purpose of decreasing the weight of the strip and making it more flexible.

In the embodiment of FIGURES 7 and 8, the two seal strips 5 and 6 are joined together near their radially inward end by a double keyway and pin connection. To this end, there are provided in the adjacent side walls of the strips 5 and 6, corresponding grooves of semicircular cross-section 16, that extend lengthwise of the strips. A cylindrical pin 17 is inserted into the so formed keyway. The pin 17 fits rather loosely in the grooves 16, so that in operation the pin 17 is displaced radially by centrifugal force. When this happens, the seal strips 5 and 6 are spread apart at the bottom of the groove 2 and pressed against its side walls. This results in a damping of oscillations of the strips 5 and 6 that might otherwise occur. This method of connection, like the connection of FIGURES 5 and 6, permits certain axial movements of the seal strips relative to one another. This may be desirable to enable one seal strip to bear against one side part of the housing, and for the other strip to bear against the other side part of the housing.

From the foregoing description it is evident that there have been provided by the present invention, apex seal structures which combine the advantages of one-piece and stacked element construction of the prior art, while at the same time avoiding their disadvantageous features, particularly tendency to fracture while in operation.

While several embodiments of the invention have been described, it should be understood that the invention is not limited to the structural details shown. Further modifications may occur to those skilled in the art, and it is intended that those which do not essentially depart from the spirit of the present invention, be embraced within the invention.

Having now particularly described the nature of the invention, I declare that what I claim is:

1. An apex seal to be inserted in an axially-through running apex groove of a Wankel type rotary engine with play in both the radial and lateral directions for sealing engagement, at the radially outer extremity of the seal, with the inner peripheral surface of the engine housing, said seal comprising a plurality of basically planar seal strips to be inserted in said groove such that their respective defining planes are essentially radially oriented and adjacent ones are in contact with each other, and means for interconnecting said strips towards their radially inner ends so as to prevent relative radial motion as between the strips while permitting relative lateral motion and radial motion of all strips as a unit.

2. The invention according to claim 1, wherein the interconnecting means comprises a welded seam.

3. The invention according to claim 1, wherein the interconnecting means comprises a rivet that runs laterally through the seal strips.

4. The invention according to claim 1, wherein the number of seal strips is at least three, the laterally outer strips being made of a material different from the material of the interior strips, the radially outermost surface of the apex seal being so shaped that only those strips, which are interior of the laterally outer strips, engage the aforesaid inner peripheral surface.

5. The invention according to claim 4, wherein the below listed parts have the following respective compositions:

| | |
|---|---|
| Laterally outer seal strips | Nitrided steel. |
| Remainder of seal strips | Sintered hard graphite. |
| Engine rotor | Cast iron alloy. |
| Engine housing | Chrome-plated aluminum. |

6. The invention according to claim 1 wherein the seal strips are truncated along a pair of planes which are oblique with respect to the axial extension, and wherein the apex seal is provided with a pair of single-piece triangular end-legs filling the gaps created by the truncating planes.

7. The invention according to claim 4 wherein the seal strips are truncated along a pair of planes which are oblique with respect to the axial extension, and wherein the apex seal is provided with a pair of single-piece triangular end-legs filling the gaps created by the truncating planes.

8. The invention according to claim 7, wherein the below listed parts have the following respective compositions:

| | |
|---|---|
| Laterally outer seal strips | Nitrided steel. |
| Remainder of seal strips | Sintered hard graphite. |
| Engine rotor | Cast iron alloy. |
| Engine housing | Chrome-plated aluminum. |

9. The invention according to claim 4, wherein each of the laterally outer strips is provided at its bottom surface and towards each end of such bottom surfaces with a laterally inwardly extending lug, corresponding lugs of the two laterally outer strips being offset axially, the lugs constituting the interconnecting means.

10. The invention according to claim 9, wherein strips interior of the laterally outer strips are seated on the lugs.

11. The invention according to claim 9, wherein strips interior of the laterally outer strips are provided with at least one laterally through-running cutout.

12. The invention according to claim 1, wherein adjacent surfaces of seal strips are recessed laterally outwardly, the recesses being mutually opposed and having substantial axial extension to form a double keyway, and a pin loosely inserted in said keyway and constituting the interconnecting means.

13. The invention according to claim 12, wherein the recesses are semi-circular in profile and the pin is cylindrical.

No references cited.

SAMUEL LEVINE, *Primary Examiner.*